(12) United States Patent
Thomson et al.

(10) Patent No.: US 8,635,348 B2
(45) Date of Patent: Jan. 21, 2014

(54) SWITCH FABRIC SERVICE HOSTING

(75) Inventors: Pat Thomson, Mesa, AZ (US); Mark Sullivan, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 2041 days.

(21) Appl. No.: 11/296,250

(22) Filed: Dec. 7, 2005

(65) Prior Publication Data

US 2007/0127504 A1 Jun. 7, 2007

(51) Int. Cl.
*G06F 15/16* (2006.01)
*G06F 15/177* (2006.01)
*G06F 15/173* (2006.01)

(52) U.S. Cl.
USPC ........... 709/229; 709/203; 709/204; 709/205; 709/220; 709/221; 709/222; 709/223; 709/224; 709/225; 709/226

(58) Field of Classification Search
USPC .......... 709/227, 203–205, 220–222, 223–226
See application file for complete search history.

(56) References Cited

U.S. PATENT DOCUMENTS

| | | | | |
|---|---|---|---|---|
| 5,526,358 A | * | 6/1996 | Gregerson et al. | 709/221 |
| 5,699,351 A | * | 12/1997 | Gregerson et al. | 370/256 |
| 5,778,185 A | * | 7/1998 | Gregerson et al. | 709/226 |
| 5,938,732 A | * | 8/1999 | Lim et al. | 709/229 |
| 7,039,694 B2 | * | 5/2006 | Kampe et al. | 709/222 |
| 2002/0065919 A1 | * | 5/2002 | Taylor et al. | 709/226 |
| 2002/0103889 A1 | * | 8/2002 | Markson et al. | 709/223 |
| 2007/0127504 A1 | * | 6/2007 | Thomson et al. | 370/400 |

* cited by examiner

*Primary Examiner* — Emmanuel L Moise
*Assistant Examiner* — Edward Kim
(74) *Attorney, Agent, or Firm* — Blakely, Sokoloff, Taylor & Zafman LLP

(57) ABSTRACT

An endpoint node on a switch fabric announces an intent to host a service for the switch fabric. The announcement includes an announcement entry to an announcement record in a data repository maintained at a designated endpoint node on the switch fabric. The announcement entry includes the endpoint node's preference to take a given role to host the service. The endpoint node queries the announcement record to determine what other endpoint nodes have announced an intent to host the service. Based, at least in part, on the query, the endpoint node determines a role it will take to host the service. The endpoint node updates the announcement record to indicate the role.

32 Claims, 6 Drawing Sheets

SWITCH FABRIC SERVICE HOSTING

BACKGROUND

In networking environments such as those used in telecommunication and/or data centers, a switch fabric is utilized to rapidly move data. Typically a switch fabric provides a communication medium that includes one or more point-to-point communication links interconnecting one or more nodes (e.g., endpoints, switches, modules, blades, boards, etc.). The switch fabric may operate in compliance with industry standards and/or proprietary specifications. One example of an industry standard is the Advanced Switching Interconnect Core Architecture Specification, Rev. 1.1, published November 2004, or later version of the specification ("the ASI standard").

Typically a switch fabric in a telecommunication and/or data center environment includes a switch fabric management architecture to maintain a highly available communication medium and to facilitate the movement of data through the switch fabric. As part of a typical switch fabric management architecture, one or more nodes provide a service to manage/control at least a portion of each node's switch fabric configuration as well as the communication links that interconnect the nodes coupled to the switch fabric (e.g., via spanning tree or fabric ownership). These nodes may be denoted as fabric owners and are well known by the other nodes of the switch fabric. Fabric owners are typically located on an endpoint (e.g., a node coupled to the edge of the switch fabric) with adequate resources to support fabric owner services, e.g., processing power, memory, communication bandwidth, etc.

In addition to a fabric owner service, the switch fabric management architecture also includes various other services to support management activities for elements that process and/or forward data through and/or between one or more nodes coupled to a switch fabric. These services, for example, may be hosted by the same endpoints hosting a fabric owner service and/or may be hosted by one or more other endpoints with adequate resources to support or host one or more services. A typical service has its own set of messages which fit the functional requirements of that service and which together form a protocol for interaction with the service. Clients or consumers of a service send a request message to the service and receive a response message from the service.

DETAILED DESCRIPTION

As mentioned in the background, a typical switch fabric may include one or more well known endpoints hosting a switch fabric owner service. Additionally, other endpoints may host services that provide various management functions. In general, a switch fabric is designed such that a given endpoint is designated to take a primary host role for a service and other endpoints may be designated a subordinate role for the service. These subordinate roles may temporarily or permanently host the service should the primary host fail, no longer be able to host the service, or consumers of the service are no longer able to access or communicate with the primary host.

Typically, the roles for an endpoint to host a fabric owner service are decided based on a selection/election process that includes a pre-established set of rules or criteria. This may be the case due to the importance of fabric ownership to configure switch fabric elements to initiate operations on a switch fabric. However, criteria to determine roles for other services may be more flexible than the criteria to determine roles for a fabric owner service. The roles to host these services may depend on the capabilities of other endpoints and/or the aggregate capability of the switch fabric. Thus an endpoint or combination of endpoints with adequate resources may vie for a role to host these other services. The endpoint node hosting a fabric owner service (fabric owner) may gather the information to determine the roles. But multiple endpoints vying for a role may create a large amount of data traffic (e.g., overhead). This overhead may be problematic to the efficient configuration of switch fabric elements. Additionally, a lengthy selection process to determine roles may complicate and excessively prolong the configuration of a switch fabric at initiation and during changes to the switch fabric topology.

In one example, an endpoint on a switch fabric announces an intent to host a service for the switch fabric. The announcement is to include an announcement entry to an announcement record in a data repository maintained or accessible to a designated endpoint (e.g., a fabric owner) on the switch fabric. The announcement entry may include the endpoint's unique identifier, a preference to take a given role to host the service and a timestamp based on a time the announcement entry was added to the announcement record. The announcement record may be identified via a unique key associated with the service. The endpoint then queries the announcement record to determine what other endpoints have announced an intent to host the service. The endpoint, based at least in part on that query, determines a role it will take to host the service. The endpoint then updates the announcement record to indicate the role.

Figure 1:
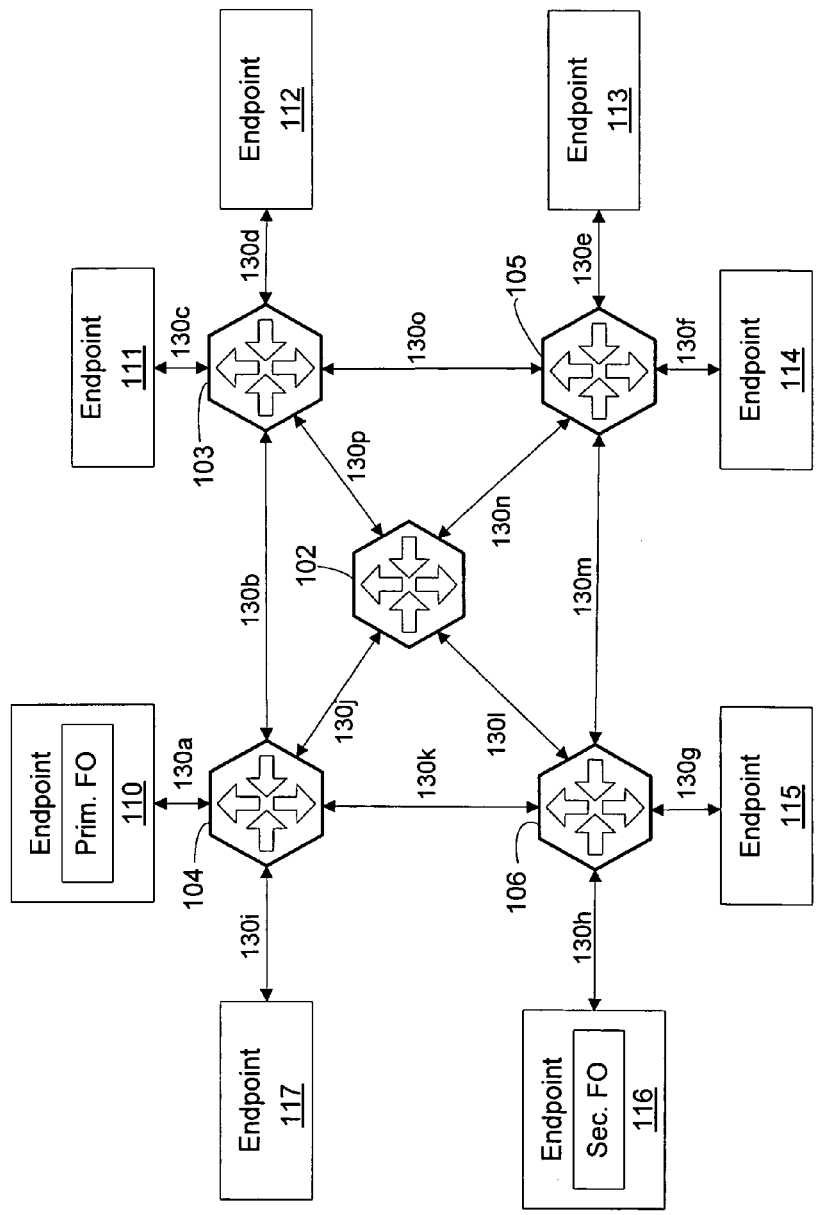
FIG. 1 is an illustration of example switch fabric elements.

FIG. 1 is an illustration of example switch fabric 100 elements. As shown in FIG. 1, switch fabric 100 elements include various nodes graphically depicted as switches 102-106 and endpoints 110-117. In one example, each of these nodes is coupled to switch fabric 100 with endpoints 110-117 being coupled on the edge of switch fabric 100 and switches 102-106 being coupled within switch fabric 100.

In one example, switch fabric 100 is operated in compliance with the ASI standard, although this disclosure is not limited to only switch fabrics that operate in compliance with the ASI standard. In FIG. 1, endpoints 110 and 116 are depicted as hosting a fabric owner service. In one example, endpoint 110 is a primary host to the fabric owner service and endpoint 116 is the secondary host. These endpoints, for example, include the resources needed to host a fabric owner service for switch fabric 100, e.g., adequate processing power, memory, communication bandwidth, etc. As a result, endpoints 110 and 116 may have been selected/elected as fabric owners (FO) for switch fabric 100 according to the criteria described in the ASI standard.

In one example, as depicted in FIG. 1, switch fabric 100 includes communication links 130a-p. These communication links include point-to-point communication links that couple in communication the nodes (e.g., endpoints 110-117, switches 103-106) of switch fabric 100.

In one implementation, following the selection/election of endpoints 110 and 116 as the primary and secondary host for fabric owner services for switch fabric 100, one or more endpoints announce an intent to host one or more services. As mentioned in the background, any endpoint or combination of endpoints with adequate resources may host a service. In an ASI compliant switch fabric 100, these services may include, but are not limited to, event, multicast group management, topology and protocol management. This disclosure is not limited to only ASI-compliant services but may also include other services fulfilling various management roles/functions for switch fabrics that may operate in compliance with other switch fabric standards or proprietary-based switch fabric specifications.

In one implementation, a fabric-wide data repository is maintained by a well-known or designated element of switch fabric 100. For example, endpoint 116 is well-known via its selection/election as a fabric owner for switch fabric 100. Each service that may exist or is possibly used for various management roles on switch fabric 100 may be associated with a unique key and may have an announcement record stored in this data repository. In one example, an endpoint searches for the unique key to find an announcement record for a service and makes an announcement entry in the service's announcement record to indicate an intent to host the service for switch fabric 100.

In one example, each announcement entry by an endpoint includes a unique identifier associated with the endpoint. The endpoint's unique identifier, for example, is a given 64-bit Extended Unique Identifier (EUI) that identifies the endpoint to other elements coupled to switch fabric 100. This disclosure is not limited to a 64-bit EUI, other types and/or sizes of identifiers may be used. The announcement entry may also indicate an endpoint's preference to take a given role to host the service, e.g., primary, secondary, tertiary, quaternary, etc.

In one example, an announcement entry made by an endpoint to indicate an intent to host a service is appended with a timestamp referenced from a clock maintained at endpoint 116 (clock not shown). The timestamp is based on a time the announcement entry was added to the announcement record for that service. As mentioned above, this announcement record may be identified by a unique key associated with the service.

In one implementation, other endpoints also announce an intent to host the service by entering announcement entries to the announcement record for that service. In one example, endpoint 111, at fixed or variable time intervals, queries the announcement record for that service to determine what other endpoints have announced an intent to host the service.

As described below for FIG. 5, endpoint 111, based at least in part on the query, determines a role endpoint 111 will take to host the service and then updates the announcement record to indicate the role, e.g., primary, secondary, tertiary or quaternary host.

Figure 2:
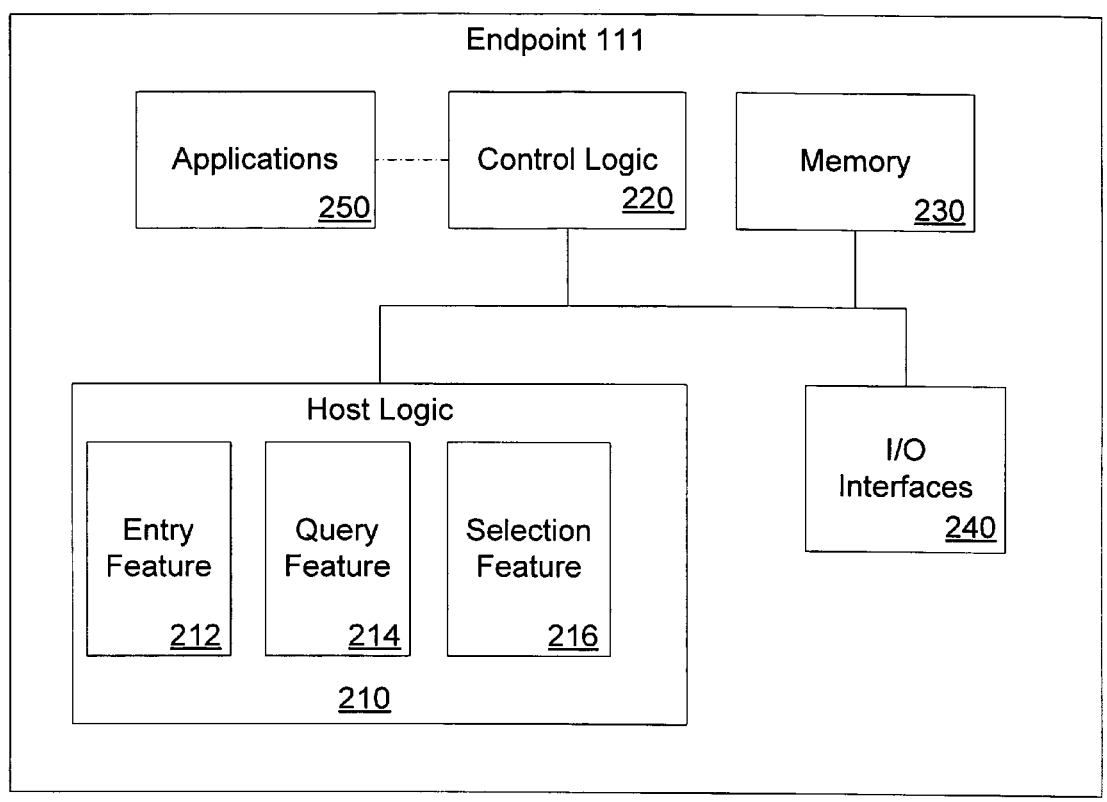
FIG. 2 is a block diagram example architecture for an endpoint to host a service.

FIG. 2 is a block diagram example architecture for endpoint 111 to host a service. In FIG. 2, endpoint 111's architecture includes host logic 210, control logic 220, memory 230, input/output (I/O) interfaces 240, and optionally one or more applications 250, each coupled as depicted.

In one implementation, the elements portrayed in FIG. 2's block diagram are endpoint 111 resources to host one or more services for switch fabric 100. Thus, control logic 220 may control the overall operation of endpoint 111 and may represent any of a wide variety of logic device(s) or executable content an endpoint allocates to host one or more services. Control logic 220 may be a microprocessor, network processor, microcontroller, field programmable gate array (FPGA), application specific integrated chip (ASIC), or any combination thereof.

In FIG. 2, host logic 210 includes entry feature 212, query feature 214 and selection feature 216. In one implementation, host logic 210, responsive to endpoint 111 and/or control logic 220 announces an intent to host a service, queries an announcement record for the service, determines or selects a role endpoint 111 will take to host the service and then updates the announcement record to indicate the selected role.

In one example, host logic 210 represents a portion of the resources allocated by endpoint 111 to host a service. Thus, host logic 210 may include a microprocessor, network processor, microcontroller, FPGA, ASIC, or executable content to implement entry feature 212, query feature 214 and selection feature 216.

According to one example, memory 230 is used by host logic 210 to temporarily store information. For example, information that is related to the selection of a role endpoint 111 takes to host a service. Memory 230 may also include encoding/decoding information to facilitate or enable the generation of packet-based entries to an announcement record for a service to possibly be hosted by endpoint 111. If endpoint 111 were to host a fabric owner service, for example, memory 230 could also contain the data repository to store announcement records.

I/O interfaces 240 provide a communications interface via a communication medium or is link between endpoint 111 and another node coupled to or remote to switch fabric 100. As a result, I/O interfaces 240 enable control logic 220 or host logic 210 to receive a series of instructions from application software external to endpoint 111. The series of instructions may activate control logic 220 or host logic 210 to implement one or more features to take a role to host a service on switch fabric 100.

In one example, endpoint 111 includes one or more applications 250 to provide internal instructions to control logic 220 or other resources allocated to host one or more services (e.g., host logic 210). Such applications 250 may be activated to generate a user interface, e.g., a graphical user interface (GUI), to enable administrative features, and the like. For example, a GUI provides a user access to memory 230 to modify or update information to facilitate endpoint 111's hosting of one or more services for switch fabric 100.

Figure 3:
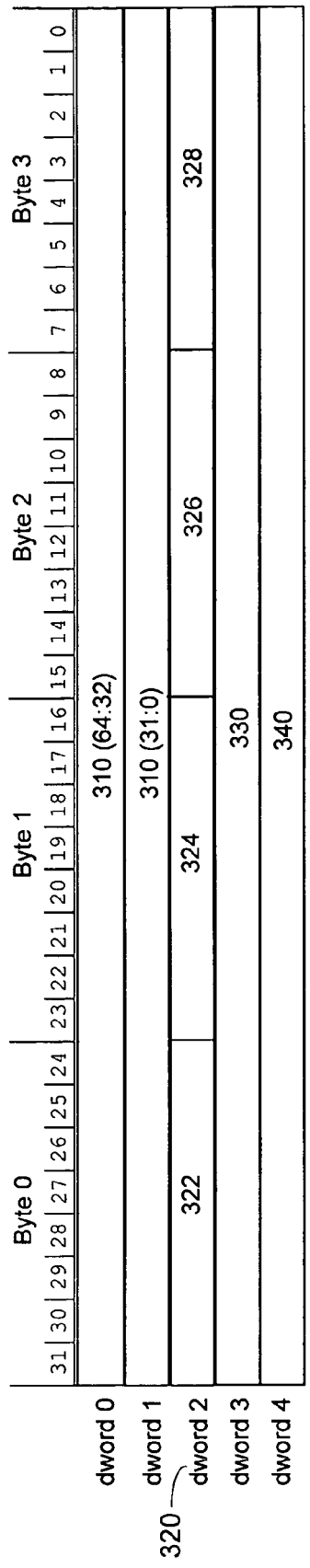
FIG. 3 is an example announcement entry format.

In another example, applications 250 include one or more application interfaces to enable external applications to provide instructions to control logic 220 or host logic 210. One such external application could be a GUI as described above FIG. 3 is an example announcement entry format 300. In one implementation, an announcement in the format of announcement entry format 300 is encapsulated within an ASI route header and routed to the designated endpoint maintaining the data repository for an ASI compliant switch fabric 100 (e.g., endpoint 110). In this implementation, announcement entry format 300 includes fields 310, 320, 330 and 340 in double words (dwords) 0-4. In addition, field 320 includes sub-fields 322, 324, 326 and 328.

In one implementation, field 310 includes a node's unique identifier or serial number. This unique identifier, as mentioned above, is a given 64-bit Extended Unique Identifier (EUI) that is associated with an endpoint and used to identify the endpoint to other elements coupled to switch fabric 100. In one example, the first 32-bits of the 64-bit EUI are placed in dword 1 and the second 32-bits are placed in dword 0. This identifier may be assigned by the manufacturer of an endpoint node or device or may be assigned by a fabric owner (e.g., endpoint 110). This identifier, for example, identifies that endpoint to other elements coupled to switch fabric 100.

In one implementation, field 320 includes entry information to indicate a preference for a role an endpoint has announced an intent to take to host a service. In one example, field 320 includes sub-fields 322, 324, 326 and 328 in bytes 0-4 to indicate a preference for a given role. In one example, a given role may be a primary, secondary, tertiary, or quaternary host role for a switch fabric service, although this disclosure is not limited to only these 4 roles.

In one example, an endpoint includes information in sub-fields 322, 324, 326 and 328 to indicate a level of interest to take a given role to host the service. This interest may be indicated by a value or weighting placed in each sub-field. For example, a value of 0 in sub-field 322 indicates a lowest interest level and a value of 256 (for an 8-bit sub-field) indicates a highest interest level in taking on the role of primary host. Thus, in one example, an endpoint places a low value in a sub-field for a given role it has the least interest and a higher value in a sub-field for a given role it has the greatest interest.

In one implementation, field 330 includes information to indicate the timestamp included in an announcement entry to announce an intent to host a service. This timestamp, for example, is referenced from a clock maintained at the endpoint hosting or maintaining the data repository (e.g., a fabric owner).

In one implementation, field 340 includes information to indicate the timestamp appended to a selection cutoff as determined by a selection coordinator. In one example, the selection coordinator is the first endpoint to announce an intent to host a service. As the selection coordinator, that endpoint opens a window of time for other endpoints to announce an intent to host a service. The cutoff timestamp included in field 340 is appended to a subsequent entry or update to the announcement record by the selection coordinator to close the window of time to initiate requests to host a service. In one example, until the window of time is closed, no timestamp information or a default value is included in field 340 to indicate to other endpoints that the window is still open.

In one implementation, an endpoint places a query request to the fabric owner to obtain the announcement record for a service in which the endpoint previously entered an announcement entry. The fabric owner returns a message that includes the announcement record and the announcement entries made by the endpoint and any other endpoints that have indicated an intent to host the service. The endpoint determines by comparing the timestamps included in each endpoint's announcement entry in field 330 that the endpoint is the first to make an announcement entry. Thus, the endpoint determines it is the selection coordinator for this service.

In one example, based, at least in part, on the service or other factors, the selection coordinator may close the window of time that other endpoints can announce an intent to host the service. The selection coordinator may then place a request to the fabric owner to append a timestamp to field 340 to mark the cutoff for the selection of candidates to host the service. At this point all announcement entries for the announcement record for that service may have the cutoff timestamp appended to field 340.

Figure 4:
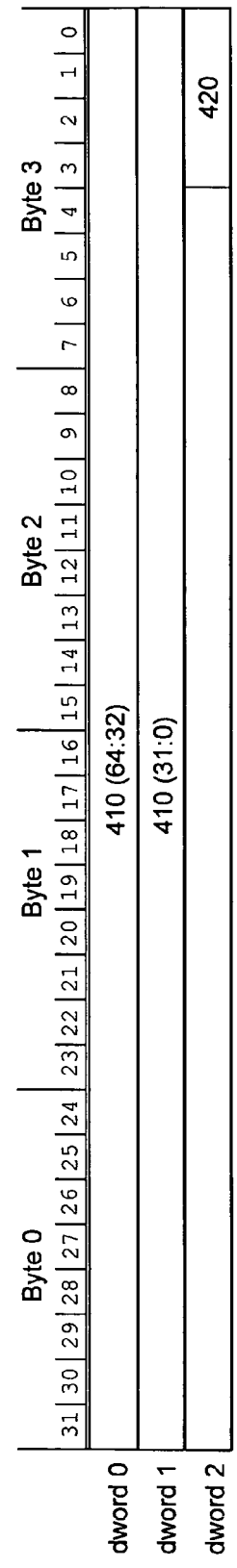
FIG. 4 is an example update entry format.

FIG. 4 is an example update entry formatted according to format 400. In one implementation, an endpoint updates an announcement record to indicate a role the endpoint will take to host the service. Information in the format of update entry format 400 is encapsulated within an ASI route header and routed to the designated endpoint maintaining the data repository for an ASI compliant switch fabric 100 (e.g., endpoint 110). In this implementation, update entry format 400 includes field 410 in dwords 0-1 and field 420 in bits 0-3 of dword 2.

In one implementation, field 410 includes a node's unique identifier or serial number. This unique identifier, as mentioned above for field 310 in announcement entry format 300, is given a 64-bit EUI that is associated or assigned to an endpoint on switch fabric 100 that is making a data repository entry update. In one example, this update indicates in field 420 the role the endpoint will take to host a service on switch fabric 100. As described below for FIG. 5, this role is based on a selection scheme implemented by the endpoint. In one example, bits 0-3 of field 420 are selectively asserted by the endpoint to indicate either a primary, secondary, tertiary, or quaternary role. For example, if bit 0 is the only bit asserted in field 420, the endpoint will take on the primary role, if bit 1 is the only bit asserted the endpoint will take on the secondary role and so forth.

Figure 5:
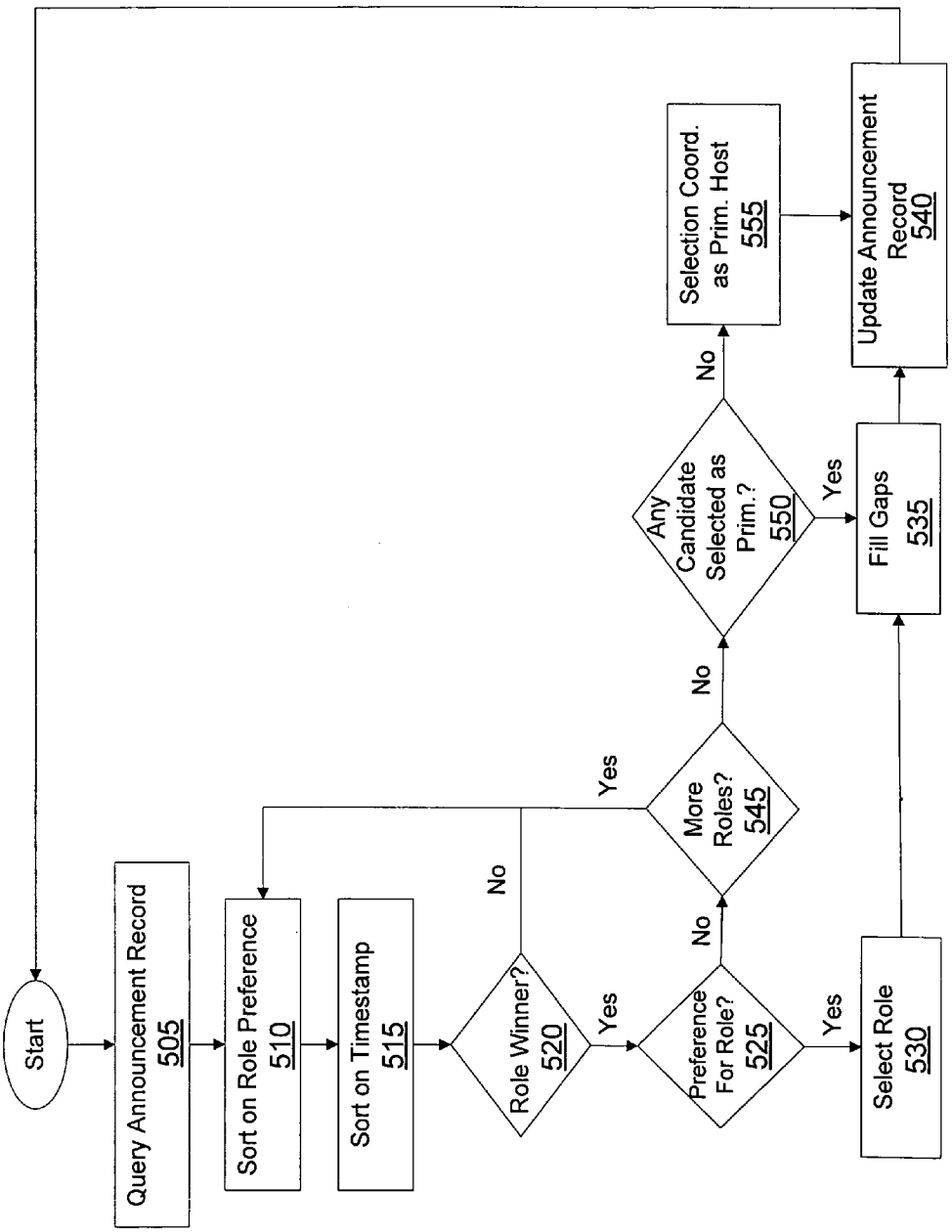
FIG. 5 is a flow chart of an example method to determine a role an endpoint will take to host a service.

FIG. 5 is a flow chart of an example method to determine a role endpoint 111 will take to host a service. In this example method, switch fabric 100 operates in compliance with the ASI standard. However, as mentioned above, this disclosure is not limited to only ASI compliant switch fabrics but may also apply to other switch fabric standards or propriety-based switch fabric specifications.

In one implementation, ASI compliant switch fabric 100 has completed at least a portion of its initialization and both primary and secondary fabric owners have been elected as depicted in FIG. 1. In addition, endpoint 110, as the primary fabric owner, maintains a data repository that includes announcement records for services on switch fabric 100. Also, in this example method, endpoint 111 has already announced an intent via an announcement entry (e.g., utilizing announcement entry format 300) to host a given service. For example, endpoint 111 announces an intent to host a topology service for switch fabric 100.

In block 505, in one example, host logic 210 activates query feature 214. Query feature 214 places a query to the data repository maintained at endpoint 110. In this example, endpoint 111 maintains in a memory (e.g., memory 230) a unique key associated with a topology service. This key may be obtained from the memory by query feature 214 and used to place the query to obtain information from the topology service's announcement record stored in the data repository.

In one implementation, endpoint 110 returns a response to the query. This response is encapsulated in an ASI header and includes information for one or more announcement entries made to the topology service's announcement record. In one example, a packet with the ASI header and the information of an announcement entry is forwarded by endpoint 110 for each announcement entry made to the announcement record by endpoint candidates to host the topology service. The portion of the packet, including the announcement entry information is in the format of announcement entry format 300. These candidates, for example, are identified by the EUI in field 310 of each announcement entry. In this implementation, if a cutoff timestamp is included in field 340, a selection coordinator (the first initiator) has closed the window of time to initiate a request to host a service. The announcement record information is then temporarily stored in a memory (e.g., memory 230).

In one example, if no cutoff timestamp is included in field 340, query feature 314 may first determine if the timestamp included in endpoint 111's announcement entry in field 330 is the earliest timestamp as compared to the timestamp in field 330 of other announcement entries. If the timestamp is the earliest, endpoint 111 is the selection coordinator and as described above, determines when the selection time period is closed. If the timestamp is not the earliest, query feature 314 continues (e.g., at certain time intervals) to query the announcement record until a cutoff timestamp is included in field 340 of each candidate's announcement entry.

In one example, since an announcement entry with an older timestamp in field 330 as compared to a timestamp in field 340 indicates an intent to host a service was announced after the window to announce an intent to host the service was closed, query feature 314 will disregard all announcement entries with older timestamps in field 330 as compared to timestamps in field 340. These disregarded announcement entries will not be temporarily stored.

In block 510, in one example, host logic 210 activates selection feature 216. Selection feature 216 obtains the topology service's announcement record requested and temporarily stored by query feature 214. Selection feature 216, in one example, first sorts each endpoint candidate's announcement entry by indicated preference to take on a given role. This sort, in one example, starts with the primary role preferences. Thus, an announcement indicating a high interest for a primary role will be sorted at the top.

In block 515, in one example, selection feature 216 then sorts announcement entries for each level of interest for a given role based on the timestamp included in field 330 for each candidate's announcement entry. For example, if the given role is primary host and two or more endpoints indicate the same preference to take on that role, the endpoint's announcement entry with the earliest timestamp is sorted at the top for the primary role. Thus, announcement entries with the highest preference for a given role and the earliest timestamp are sorted at the top.

In block 520, selection feature 216 determines whether endpoint 111 is the winner for a given role to take to host the topology service (e.g., its announcement entry was sorted at the top). If endpoint 111 was not the winner for a given role the process moves to block 545.

In block 525, in one example, selection feature 216 determines whether endpoint 111 has indicated any interest to take on the given role it has won to host the topology service. If no interest, the process moves to block 545.

In block 530, selection feature 216 has determined, based on the interest indicated in field 320 of endpoint 111's announcement entry, that endpoint 111 has an interest in hosting the role it has won. In one example, that role is selected by endpoint 111.

In block 535, in one example, selection feature 216 fills any gaps in the roles candidate endpoints are to take to host the topology service. Filling the gaps may ensure that at least one candidate endpoint is to take the primary host role. For example, no candidate endpoint was selected to take the primary host role, endpoint 111 was selected to take the secondary host role and another candidate was selected to take the quaternary host role. In this example, the gaps would be filled by selecting endpoint 111 to take the primary host role and the other candidate endpoint to take the secondary host role.

In block 540, in one example, host logic 210 then activates entry feature 212 to update the announcement record to indicate the role that endpoint 111 has been selected for. This update, in one example, is in the format of update entry format 400. The update information is then encapsulated with an ASI route header and forwarded to the data repository maintained by endpoint 110. In one example, the information in the update is used by elements coupled to switch fabric 100 that wish to use the topology service hosted by endpoint 111.

In one implementation, each candidate will also update the announcement record to indicate the roles these endpoints will take to host the topology service. These roles are also determined based on the same selection scheme used by selection feature 216 in endpoint 111.

In block 545, in one example, endpoint 111 has no interest to take on the role it won or it has failed to win selection of a role. In either instance, selection feature 214 determines whether any more roles remain to be selected. If more roles remain, the process returns to blocks 510 and 520 and selection feature 216 sorts the announcements records for each role (using preference and time) until endpoint 111 either wins a role or has no more roles to select.

In block 550, in one example, selection feature 216 has determined that no more roles remain to be selected from the announcement record for the topology service. Selection feature 216 then determines whether any endpoint candidate has been selected to take on a primary host role for the topology service. If an endpoint has been selected to take on the primary host role, then selection feature 216 fills any gaps that may exist as described above in block 535 and entry feature 212 updates the announcement record accordingly as described in block 540.

In block 555, in one example, selection feature 216 has determined that no candidate has been selected to take on a primary host role. To ensure that at least a primary host is selected, selection feature 216 may select the selection coordinator. Thus, based on the sort in block 515, selection feature 216 selects the announcement entry from the endpoint candidate with the earliest timestamp in field 330.

In one example, endpoint 111's has the earliest timestamp in field 330 for its announcement entry. As a result, in this example, endpoint 111 is the selection coordinator. Thus, as described above for block 540, entry feature 212 forwards an entry update in the format of update entry format 400 to update the announcement record to indicate endpoint 111 is the primary host for the topology service.

In one example, the process starts over to determine the roles for another service on switch fabric 100. In another example, the process starts over if switch fabric 100 is reset or reconfigured. For example, a new fabric owner is elected/selected for switch fabric 100 or the topology of switch fabric 100 changes such that services are added or removed.

Figure 6:
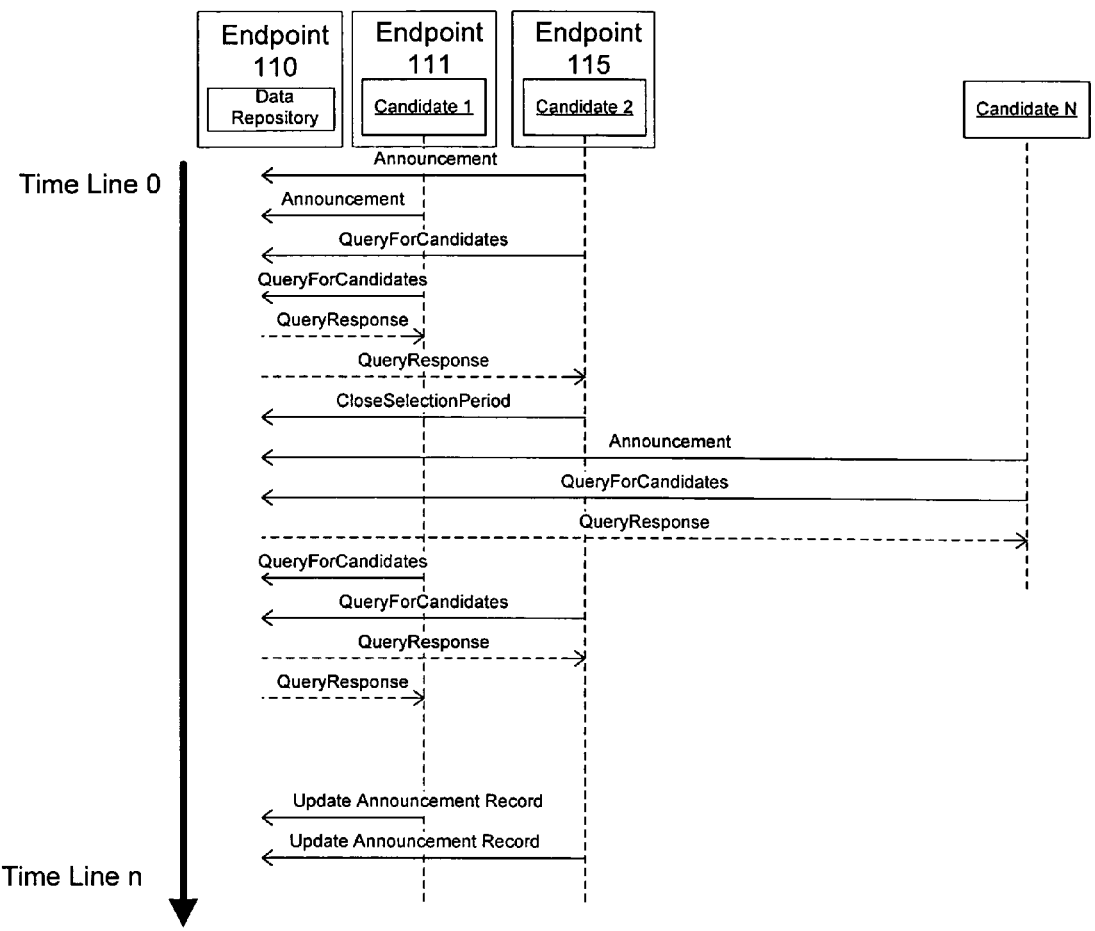
FIG. 6 is an illustration of endpoints implementing the method to determine the role one or more endpoints will take to host the service.

FIG. 6 is an illustration of endpoints implementing the method to determine the role one or more endpoints will take to host the topology service on switch fabric 100. As mentioned above, endpoint 110 is the fabric owner and may maintain the data repository. In FIG. 6 a timeline is indicated along the left side with the earliest time (timeline 0) at the top of the figure and later times towards the bottom of FIG. 6 (timeline n).

In one implementation, candidate 1 is endpoint 111 and candidate 2 is endpoint 115. In this implementation, endpoints 111 and 115 include adequate resources to host the topology service. In one example, endpoint 115 also has the same or similar architecture to host the topology service as depicted in FIG. 2 for endpoint 111. In addition candidate N may represent other endpoints on switch fabric 100 with adequate resources and the same or similar to endpoint 111's example architecture in FIG. 2.

In one example, endpoint 115 is shown in FIG. 6 as the first candidate (selection coordinator) to announce an intent to host the topology service and endpoint 111 is the next candidate to announce an intent to host the topology service. As described above, endpoint 111 and endpoint 115 query the data repository to determine what candidates have made announcement entries and based on these announcement entries, determine if the window has closed for selection.

In one example, as shown in FIG. 6, endpoint 115, as the selection coordinator, closes the window for selection. After this point in time, other candidates announcing an intent to host the topology service are not part of the selection process. For example, these other endpoints will receive query responses with timestamps in field 330 of their announcement entry that are later in time than the cutoff timestamp in field 340 of their announcement entry. Thus, in this example, candidate N determines that it missed the window and no longer participates in the selection process. Additionally, candidates that are part of the selection process will disregard all announcement entries with older timestamps in field 330 as compared to timestamps in field 340.

In one example, endpoints 111 and 115 obtain the announcement record and update the announcement record to indicate the roles these endpoints will take to host the topology service as described above.

Figure 7:
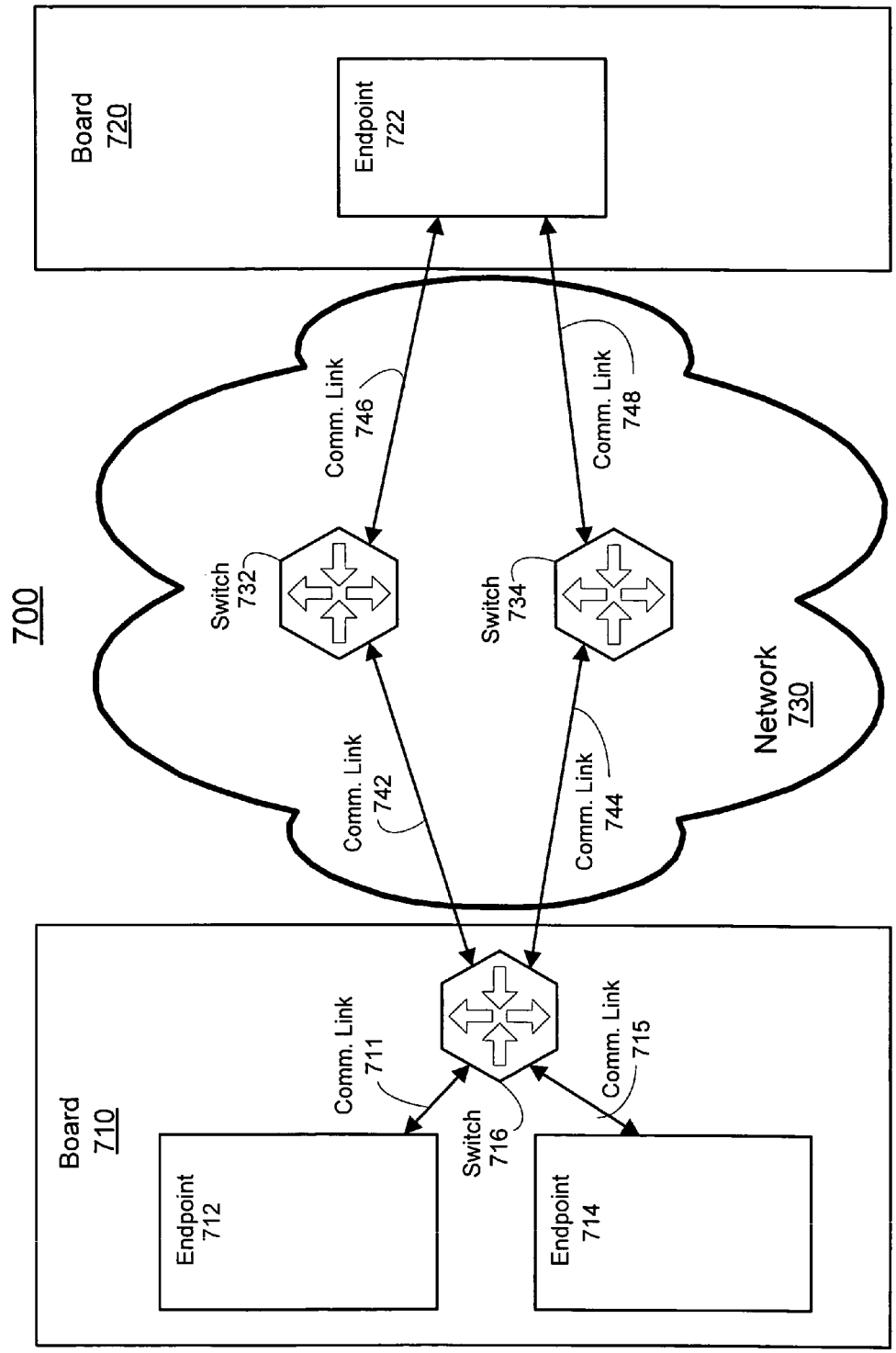
FIG. 7 is an illustration of an example switch fabric.

FIG. 7 is an illustration of an example switch fabric 700. In FIG. 7, endpoints 712, 714 and 722 on boards 710 and 720 are coupled to network 730 via communication links 742, 744, 746 and 748. In one example, although not shown in FIG. 7, each endpoint on boards 710 and 720 includes at least a portion of the example endpoint 111 architecture depicted in FIG. 2 to host a service for switch fabric 700 (e.g., host logic 210). In one example, the elements of switch fabric 700 are part of a general-purpose, modular system that operates in compliance with one or more industry standards. One industry standard is the PCI Industrial Computer Manufacturers Group (PICMG), Advanced Telecommunications Computing Architecture (ATCA) Base Specification, PICMG 3.0 Rev. 1.0, published Dec. 30, 2002, or later versions of the specification ("the ATCA standard").

In one implementation, ATCA compliant boards 710 and 720 couple to an ATCA compliant backplane (not shown) in an ATCA compliant modular computing platform. Switches 732 and 734 may also couple to the backplane and communication links 742, 744, 746, and 748 may be routed through the backplane.

In one example, the two endpoint's 712 and 714 on board 710 are mezzanine cards designed and operated in compliance with the an industry standard such as the Advanced Mezzanine Card (AMC) Specification, PICMG AMC.0, Revision 1.0, published Jan. 3, 2005, or later versions of the specification ("the AMC.0 standard). ATCA compliant board 710 may be a carrier board also designed and operated in compliance with the AMC.0 standard. Switch 716 may forward data to/from endpoints 712 and 714 via communication links 711 and 715 to other elements coupled to network 730 (e.g., switches 732, 734, board 720).

In one example, the communication links depicted in FIG. 7 as coupling to switches 716, 732 and 734 are designed to forward data using one or more communication protocols associated with or described by sub-set specifications to the ATCA standard. These sub-set specifications are typically referred to as the "PICMG 3.x specifications." The PICMG 3.x specifications include, but are not limited to, Ethernet/Fibre Channel (PICMG 3.1), Infiniband (PICMG 3.2), Star-Fabric (PICMG 3.3), PCI-Express/Advanced Switching Interconnect (PICMG 3.4) and Advanced Fabric Interconnect/S-RapidIO (PICMG 3.5).

In one implementation, the communication links coupled to switches 716, 732 and 734 operate in compliance with PICMG 3.4 for PCI-Express/Advanced Switching. In this implementation, the elements of switch fabric 700 are designed to operate in compliance with the ASI standard. In one example, endpoint 712 may transmit data to endpoint 722. This data is encapsulated and tunneled using communication protocols described in the ASI standard and routed through the communication links coupled to switches 716, 732 and 734.

In one example, endpoints 712, 714 and 722 each announce an intent to host a service on switch fabric 700. In this example, an endpoint to host a fabric owner service is already elected/selected and this endpoint maintains the data repository. This well-known or designated endpoint may be any of the endpoints depicted in FIG. 7 or could be other endpoints coupled to network 730 (not shown). In this example, endpoints 712, 714 and 722 locate, within the data repository, the announcement record associated with the given service they intend to support. As described for FIG. 5 and FIG. 6, these candidates make announcement entries to this announcement record and gather announcement entries by other candidates to determine or select a role to take for the given service. For example, endpoint 712 implements the selection scheme and determines it will take on a primary host role based on its preference for the role and/or the timestamp included in its announcement entry. Endpoint 714 may determine that it will take on a secondary host role and endpoint 722 a tertiary host role. A fourth endpoint coupled to network 730 may also announce an intent to host the given service and implement the selection scheme to determine that it will take on the quaternary role. Each candidate endpoint will then update the announcement record for the given service to indicate the role the endpoint will take to host the given service.

In one example, the given service to be hosted is a topology service. This topology service may include management of switch fabric path computations and an inventory of the elements coupled to switch fabric 700. Consumers or clients of this service may place a request to the endpoint hosting this service to determine a path to route data from one element coupled to switch fabric 700 to another element coupled to switch fabric 700. In this example, endpoints to host this service need to have the resources (e.g., processing, memory, channel bandwidth) to maintain the inventory and compute a path between elements based on switch fabric 700's topology. This may also include the updating of the computations if switch fabric 700's topology changes.

In one implementation, topology service clients or consumers access the announcement record for the topology service to determine where to place a request to utilize the topology service. These topology service consumers will also use the announcement record to determine if secondary, tertiary or quaternary hosts also exist to place a request if the primary host is not available or accessible to the client. For example, endpoint 712 is a primary host for a topology service and endpoint 722 is a secondary host. In this example, switch 716 fails and causes endpoint 712 to lose its connection to network 730. A consumer of the topology service coupled to network 730 then place requests to use the topology service to the secondary host (endpoint 722) until the primary host (endpoint 712) regains its connection to the network 730.

Referring again to memory 230 in FIG. 2. Memory 230 may include a wide variety of memory media including but not limited to volatile memory, non-volatile memory, flash, programmable variables or states, random access memory (RAM), electronic erasable programmable read-only memory (EEPROM), flash, or other static or dynamic storage media. In one example, machine-readable instructions can be provided to memory 230 from a form of machine-accessible storage medium. A machine-accessible storage medium may represent any mechanism that provides (i.e., stores) information in a form readable by a machine (e.g., an ASIC, special function controller or processor, FPGA or other hardware device). For example, a machine-accessible storage medium may include: read-only memory (ROM); EEPROM; RAM; magnetic disk storage media; optical storage media; flash memory devices; and the like.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in this regard.

What is claimed is:

1. In an endpoint node on a switch fabric, a method comprising:
   sending an announcement of an intent to host a service for the switch fabric, the announcement to include an announcement entry to an announcement record in a data repository maintained at a designated endpoint node on the switch fabric, the announcement entry to indicate a preference of the endpoint node to take on a first role of a plurality of roles, wherein the announcement entry to include multiple sub-fields which each correspond to a different respective role of the plurality of roles, wherein the multiple sub-fields each include a respective value specifying a level of interest of the endpoint node to take on the role corresponding to the sub-field, each of the plurality of roles for hosting the service;
   querying the announcement record to determine what other endpoint nodes have announced an intent to host the service;
   determining a role the endpoint node will take to host the service based, at least in part, on the query, including sorting endpoint nodes based on preferences of the endpoint nodes to take on respective ones of the plurality of roles, wherein the sorting the endpoint nodes is based on the respective values of the multiple sub-fields of the announcement entry; and
   updating the announcement record to indicate the determined role.

2. A method according to claim 1, the announcement entry further including:
   a unique identifier associated with the endpoint node;
   a timestamp based on a time the announcement entry was added to the announcement record, the timestamp referenced from a clock maintained at the designated endpoint node.

3. A method according to claim 2, further comprising:
   determining that the endpoint node is a first endpoint node to announce an intent to host the service based on the timestamp included in the announcement entry;
   indicating to the designated endpoint node that the endpoint node is the first endpoint node to announce an intent to host the service;
   closing a time window for at least one other endpoint node to announce an intent to host the service, wherein another timestamp is appended to the announcement entry for the endpoint node, the time window to close based on the other timestamp.

4. A method according to claim 2, wherein determining the role the endpoint node will take to host the service based, at least in part, on the query comprises:
   comparing the endpoint node's announcement entry to another announcement entry made by another endpoint node and included in the queried announcement record, and
   selecting the endpoint node for the determined role based on the endpoint node indicating an equal preference to take the determined role as compared to the other endpoint node's indicated preference to take the determined role and the timestamp included in the endpoint node's announcement entry having an earlier time than the timestamp included in the other endpoint node's announcement entry.

5. A method according to claim 1, wherein determining the role the endpoint node will take to host the service based, at least in part, on the query comprises:
   comparing the endpoint node's announcement entry to another announcement entry made by another endpoint node and included in the queried announcement record, and
   selecting the endpoint node for the determined role based on the endpoint node indicating a higher preference to take the determined role as compared to a preference indicated by the other endpoint node to take the determined role.

6. A method according to claim 5, wherein selecting the endpoint node for a role comprises:
   determining that a primary host role has not been selected based on selecting the endpoint node for a secondary host role and selecting the other endpoint node for a tertiary host role;
   selecting the endpoint node for the primary host role; and
   selecting the other endpoint node for the secondary host role.

7. A method according to claim 1, wherein the announcement record is identified via a unique key associated with the service.

8. A method according to claim 1, wherein the determined role comprises at least one role selected from the following group of: a primary host, a secondary host, a tertiary host and a quaternary host.

9. A method according to claim 1, wherein the switch fabric to operate in compliance with the Advanced Switching Interconnect standard.

10. A method according to claim 9, wherein the designated endpoint node on the switch fabric comprises the designated endpoint node as the primary host for a fabric owner service for the switch fabric.

11. A method according to claim 9, wherein the service comprises the service to include at least one selected from the following group of: an event service, a topology service, a multicast group management service and a protocol management service.

12. An apparatus comprising:
   an endpoint node on a switch fabric, the endpoint node including logic to:
      send an announcement of an intent to host a service for the switch fabric, the announcement to include an announcement entry to an announcement record in a data repository maintained at a designated endpoint node on the switch fabric, the announcement entry to indicate a preference of the endpoint node to take on a first role of a plurality of roles, wherein the announcement entry to include multiple sub-fields which each correspond to a different respective role of the plurality of roles, wherein the multiple sub-fields each include a respective value specifying a level of interest of the endpoint node to take on the role corresponding to the sub-field, each of the plurality of roles for hosting the service;

query the announcement record to determine what other endpoint nodes have announced an intent to host the service;

determine a role the endpoint node will take to host the service based, at least in part, on the query, including the logic to sort endpoint nodes based on preferences of the endpoint nodes to take on respective ones of the plurality of roles, wherein the logic to sort the endpoint nodes based on the respective values of the multiple sub-fields of the announcement entry; and update the announcement record to indicate the determined role.

13. An apparatus according to claim 12, wherein the announcement entry to further include:

a unique identifier associated with the endpoint node;

a timestamp based on a time the announcement entry was added to the announcement record, the timestamp referenced from a clock maintained at the designated endpoint node.

14. An apparatus according to claim 12, wherein the logic to determine the role the endpoint node will take to host the service based, at least in part, on the query comprises logic to:

compare the endpoint node's announcement entry to another announcement entry made by another endpoint node and included in the queried announcement record, and select the endpoint node for the determined role based on the endpoint node indicating a higher preference to take the determined role as compared to a preference indicated by the other endpoint node to take the determined role.

15. An apparatus according to claim 12, wherein the announcement record is identified via a unique key associated with the service.

16. An apparatus according to claim 12, wherein the determined role comprises at least one role selected from the following group of: a primary host, a secondary host, a tertiary host and a quaternary host.

17. An apparatus according to claim 12, wherein the endpoint node announces the intent to host the service based, at least in part, on whether the endpoint node has adequate resources to support a hosting of the service.

18. An apparatus according to claim 12, wherein the switch fabric to operate in compliance with the Advanced Switching Interconnect standard.

19. An apparatus according to claim 17, wherein the designated endpoint node on the switch fabric comprises the designated endpoint node as the primary host for a fabric owner service for the switch fabric.

20. A switch fabric comprising:

a designated endpoint node to include a memory to maintain a data repository; and another endpoint node, the other endpoint node including logic to:

send an announcement of an intent to host a service for the switch fabric, the announcement to include an announcement entry to an announcement record in the data repository maintained at the designated endpoint node, the announcement entry to indicate a preference of the other endpoint node to take on a first role of a plurality of roles, wherein the announcement entry to include multiple sub-fields which each correspond to a different respective role of the plurality of roles, wherein the multiple sub-fields each include a respective value specifying a level of interest of the other endpoint node to take on the role corresponding to the sub-field, each of the plurality of roles for hosting the service, query the announcement record to determine what other endpoint nodes have announced an intent to host the service, determine a role the other endpoint node will take to host the service based, at least in part, on the query, including the logic to sort endpoint nodes based on preferences of the endpoint nodes to take on respective ones of the plurality of roles, wherein the logic to sort the endpoint nodes based on the respective values of the multiple sub-fields of the announcement entry, and update the announcement record to indicate the determined role.

21. A switch fabric according to claim 20, wherein the logic to determine the role the other endpoint node will take to host the service based, at least in part, on the query comprises logic to:

compare the other endpoint node's announcement entry to one or more other announcement entries made by one or more other endpoint nodes and included in the queried announcement record, and select the other endpoint node for the determined role based on the other endpoint node indicating a higher preference to take the determined role as compared to a preference indicated by the one or more other endpoint nodes to take the determined role.

22. A switch fabric according to claim 20, wherein the determined role comprises at least one role selected from the following group of: a primary host, a secondary host, a tertiary host and a quaternary host.

23. A switch fabric according to claim 20, wherein the other endpoint node announces the intent to host the service based, at least in part, on whether the other endpoint node has adequate resources to support a hosting of the service.

24. A switch fabric according to claim 20, wherein the announcement record is identified via a unique key associated with the service.

25. A switch fabric according to claim 20, wherein the switch fabric is part of a modular platform system operated in compliance with the Advanced Telecommunications Computing Architecture standard, the designated endpoint node and the other endpoint node to each reside on a board received and coupled to a backplane in the modular platform system.

26. A switch fabric according to claim 20, wherein the switch fabric comprises the switch fabric to operate in compliance with the Advanced Switching Interconnect standard.

27. A switch fabric according to claim 26, wherein the designated endpoint node comprises the designated endpoint node as the primary host for a fabric owner service for the switch fabric.

28. A non-transitory machine-accessible storage medium having stored thereon content, which, when executed by an endpoint node on a switch fabric causes the endpoint node to:

send an announcement of an intent to host a service for the switch fabric, the announcement to include an announcement entry to an announcement record in a data repository maintained at a designated endpoint node on the switch fabric, the announcement entry to indicate a preference of the endpoint node to take on a first role of a plurality of roles, wherein the announcement entry to include multiple sub-fields which each correspond to a different respective role of the plurality of roles, wherein the multiple sub-fields each include a respective value specifying a level of interest of the endpoint node to take on the role corresponding to the sub-field, each of the plurality of roles for hosting the service;

query the announcement record to determine what other endpoint nodes have announced an intent to host the service;

determine a role the endpoint node will take to host the service based, at least in part, on the query, including sorting endpoint nodes based on preferences of the endpoint nodes to take on respective ones of the plurality of roles, wherein the sorting the endpoint nodes is based on the respective values of the multiple sub-fields of the announcement entry; and update the announcement record to indicate the determined role.

29. A machine-accessible storage medium according to claim 28, the announcement entry to further include:

a unique identifier associated with the endpoint node;

a timestamp based on a time the announcement entry was added to the announcement record, the timestamp referenced from a clock maintained at the designated endpoint node.

30. A machine-accessible storage medium according to claim 28, wherein determining the role the endpoint node will take to host the service based, at least in part, on the query comprises the endpoint node to:

compare the endpoint node's announcement entry to one or more other announcement entries made by one or more other endpoint nodes and included in the queried announcement record, and select the endpoint node for the determined role based on the endpoint node indicating a higher preference to take the determined role as compared to a preference indicated by the one or more other endpoint nodes to take the determined role.

31. A machine-accessible storage medium according to claim 28, wherein the announcement record comprises the announcement record identified via a unique key associated with the service.

32. A machine-accessible storage medium according to claim 28, wherein the determined role comprises at least one role selected from the following group of: a primary host, a secondary host, a tertiary host and a quaternary host.

* * * * *